Oct. 11, 1966    J. A. GATLIN ETAL    3,278,831
REGULATOR SYSTEMS FOR SELF-EXCITED DIRECT CURRENT GENERATORS
Filed April 30, 1963    4 Sheets-Sheet 1

WITNESSES:
John L. Chopp
Donald R. Lackey

INVENTORS
James A. Gatlin, Powell O. Bobo
and Nicolay Kormanik
BY
F. E. Browder
ATTORNEY 3,278,831
REGULATOR SYSTEMS FOR SELF-EXCITED
DIRECT CURRENT GENERATORS
James A. Gatlin, Riverdale, Md., and Powell O. Bobo, Pittsburgh, and Nikolay Kormanik, Hempfield Township, Westmoreland County, Pa., assignors to Westinghouse Electric Corporation, Pittsburgh, Pa., a corporation of Pennsylvania
Filed Apr. 30, 1963, Ser. No. 276,722
6 Claims. (Cl. 322—28)

This invention relates in general to control apparatus and more particularly to regulator systems for dynamoelectric machines.

Two methods are commonly used for dynamically controlling the output voltage of a self-excited direct current generator. The first method requires only one field winding but it also requires an amplifier having a reversible polarity output and a low internal impedance. A rotating amplifier, such as an amplidyne, is commonly used. The second method may utilize static unidirectional amplifiers, such as magnetic amplifiers, but it requires that the generator have two control field windings as well as the self-excited shunt field winding.

Accordingly, it is an object of this invention to provide a new and improved regulating system for dynamoelectric machines.

Another object of the invention is to provide a new and improved regulating system for self-excited direct current generators that require only one field excitation winding.

A further object of this invention is to provide a new and improved regulating system for self-excited direct current generators that may utilize static unidirectional amplifiers.

Another object of this invention is to provide a new and improved regulating system for direct current generators that is capable of forcing the generator voltage negatively as well as positively.

Briefly, the present invention accomplishes the above-cited objects by providing a regulating system for direct current generators in which the static unidirectional amplifiers are connected to provide a buck-boost type output. The output of the boost amplifier is applied directly to the single field winding and the output of the buck amplifier is applied to an impedance means. The direct current output voltage of the self-excited direct current generator is applied across both the single field winding and the impedance means, with the boost amplifier adding to the effect of the generator voltage by producing a component of field current that adds to the field current produced by the generator voltage. On the other hand, the buck amplifier reduces the effect of the generator voltage by effectively increasing the magnitude of the impedance means and thereby reducing the voltage applied to the field winding by the generator voltage. Resistance means, connected in series relation with the output of the buck and boost amplifiers make the regulating system continuously acting with no dead band in the control current vs. generator voltage characteristic and also allows the generator voltage to be forced negatively as well as positively.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figures 1, 2, 3, 4:
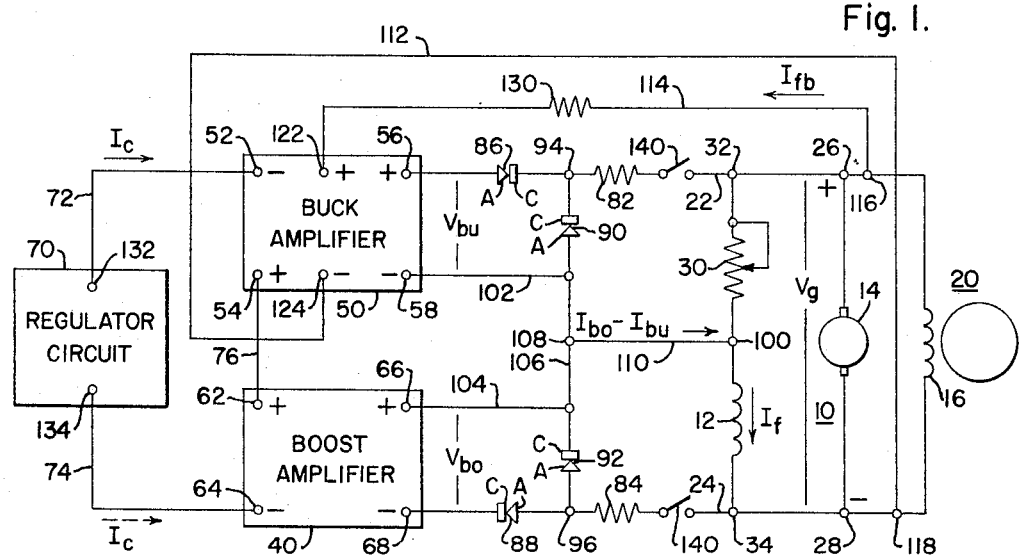
FIGURE 1 is a schematic diagram illustrating an embodiment of the invention.
FIGS. 2, 3 and 4 are schematic diagrams explanatory of the circuit diagram illustrated in FIG. 1.

Referring now to the drawings, and FIG. 1 in particular, there is illustrated a schematic diagram showing one embodiment of the invention. More specifically, an exciter system 10, comprising a direct current generator having a self-excited field winding 12 and an armature 14, is disposed to supply electrical energy to the field winding 16 of dynamoelectric machine 20. The armature 14 of the exciter system 10 is connected to conductors 22 and 24 at points 26 and 28, respectively. Conductors 22 and 24 are connected to field winding 16 of dynamoelectric machine 20, therefore applying the output voltage of the exciter system 10 to the field winding 16 of dynamoelectric machine 20. The output voltage of armature 14 of the exciter system 10 is also applied to the field winding 12. However, instead of the total armature voltage $V_g$ being applied to the field winding 12, an impedance member or rheostat 30 is connected in series circuit relation with the field winding 12 and said series circuit is connected to conductors 22 and 24 at points 32 and 34, respectively.

In order to add to the effect of the output voltage of armature 14 and increase the excitation current through field winding 12, boost amplifier 40, which may be a static unidirectional amplifier having input terminals 62 and 64 and output terminals 66 and 68, may be used. Boost amplifier 40 is so connected that control current $I_c$ into input terminal 62 increases the output voltage of said amplifier and control current $I_c$ into input terminal 64 reduces the output voltage of said amplifier.

In order to reduce the effect of the output voltage of armature 14 and decrease the excitation current through field winding 12, buck amplifier 50, which also may be a static unidirectional amplifier having input terminals 52 and 54 and output terminals 56 and 58, may be used. Buck amplifier 50 is so connected that control current $I_c$ into input terminal 52 reduces the output voltage of said amplifier, and control current $I_c$ into input terminal 54 increases the output voltage of said amplifier.

More specifically, conductors 72 and 74, carrying control current $I_c$ from regulator circuits 70, are connected to buck and boost amplifiers 50 and 40, with conductor 72 being connected to input terminal 52 on buck amplifier 50 and conductor 74 being connected to input terminal 64 on boost amplifier 40. The electric circuit for the control current $I_c$ is completely by conductor 76, which is connected from input terminal 54 of buck amplifier 50 to terminal 62 on boost amplifier 40.

The output voltages of the buck and boost amplifiers 50 and 40, are connected across the series circuit comprising impedance member or rheostat 30 and field winding 12 of the exciter system 10. In order to make amplifiers 40 and 50 continuously acting and prevent dead control bands in the control current $I_c$ vs. generator voltage $V_g$ characteristic, and still allow the generator voltage $V_g$ to be forced negatively, as well as positively, resistance members 82 and 84 may be used. Further, in order to prevent the nature of the load on the amplifiers 40 and 50 from disturbing the operation of said amplifiers, asymmetrically conducting devices or rectifiers 86, 88, 90 and 92 may be used. Rectifiers 86, 88, 90 and 92 may be semiconductor diodes, each having an anode A and a cathode C.

More specifically, the positive output terminal 56 of buck amplifier 50 is connected to the anode A of semiconductor diode 86, and the cathode C of semiconductor diode 86 is connected to one side of resistor 82 at junction 94. The remaining side of resistor 82 is connected through line 22 to point 32 and, therefore, one side of the series circuit comprising impedance member 30 and field winding 12. On the other hand, the negative output terminal 68 of boost amplifier 40 is connected to the cathode C of semiconductor diode 88 and the anode A of semiconductor diode 88 is connected to one side of resistor 84 at junction 96. The remaining side of resistor 84 is connected through conductor 24 to point 34, and, therefore, to the other side of the series circuit comprising impedance member 30 and field winding 12. The negative output terminal 58 of buck amplifier 50 and the positive output terminal 66 of boost amplifier 40 are connected in common to the junction 100 between the impedance member 30 and the field winding 12. Semiconductor diode 90 is connected across the output of buck amplifier 50, with its cathode C being connected to junction 94 between semiconductor diode 86 and resistor 82, and its anode A being connected to output terminal 58 through conductor 102. Semiconductor diode 92 is connected across the output of boost amplifier 40, with its anode A being connected to junction 96 between semiconductor diode 88 and resistor 84, and its cathode C being connected to output terminal 66 through conductor 104. Conductors 102 and 104 are connected in common by conductor 106, and point 108 on conductor 106, is connected through conductor 110 to the junction 100 between impedance member 30 and field winding 12.

In order to provide a feedback signal $I_{fb}$ from the output voltage of exciter system 10 to the buck amplifier 50, conductors 112 and 114 may be connected from points 116 and 118 on conductors 22 and 24, respectively, to terminals 122 and 124 on buck amplifier 50. Resistor 130 may be connected between terminal 122 on amplifier 50 and point 116 on conductor 22 to provide a feedback signal having the proper range of magnitude. The feedback portion of amplifier 50 is connected so that an increase in feedback signal or current $I_{fb}$ increases the output of voltage $V_{bu}$ of buck amplifier 50.

In the operation of the circuit illustrated in FIG. 1, the amplifiers 40 and 50, and regulator circuit 70 may be isolated or disconnected from the exciter system 10 by opening disconnecting means 140. The base excitation current supplied to the self-excited field winding 12 by the armature 14 may then be set by adjustable impedance means or rheostat 30. Adjusting the rheostat 30 selects the base voltage and hence the base excitation current to be supplied to the field winding 12. Closing the disconnecting means 140 connects the regulating circuit 70 and amplifiers 40 and 50 to the rheostat 30 and field winding 12, and performs the function of adding to or subtracting from the base excitation current to maintain the total excitation current $I_f$ at the value necessary to provide the proper field voltage and current to field winding 16 of dynamoelectric machine 20.

In describing the effect of the generator voltage $V_g$, the output voltage $V_{bu}$ of buck amplifier 50, and the output voltage $V_{bo}$ of boost amplifier 40 on the field excitation current, it may be helpful to determine the effect that each of the voltage sources has upon the magnitude of the field excitation current, and how the various circuit members affect the magnitude of the field excitation current. The effect of each of the three sources $V_g$, $V_{bu}$ and $V_{bo}$ on the magnitude of the field current $I_f$ is best illustrated by the use of superposition. The component of field excitation current $I_{f1}$ produced by the generator voltage $V_g$, as shown by the superposition circuit in FIG. 2, is determined by both the value of the resistance as set by rheostat 30 and the value of the resistor 82. This is due to the fact that voltage applied to rheostat 30 by the buck amplifier changes the effective impedance of rheostat 30. Therefore, the amount or portion of the generator voltage $V_g$ dropped across rheostat 30 varies with the voltage applied to rheostat 30 by buck amplifier 50. Increasing the output voltage $V_{bu}$ of buck amplifier 50, increases the voltage drop across rheostat 30 and therefore less generator voltage $V_g$ remains to be applied to the field winding 12. Since the resistor 82 determines the portion of voltage $V_{bu}$ applied to rheostat 30, the value of this resistor necessarily becomes a part of the superposition circuit for determining the excitation current component $I_{f1}$ produced by generator voltage $V_g$. The value of resistor 84 is also important, as the current flowing through resistor 84 must flow through resistors 30 and 82, and helps determine the voltage drop across resistors 30 and 82 and, therefore, enters into the determination of the portion of the voltage $V_g$ remaining to be applied to the field winding 12.

FIG. 3 shows the superposition circuit for determining the effective component of field current $I_{f2}$ produced by the output voltage $V_{bu}$ of buck amplifier 50. Resistor 82 is important, as it determines the amount of resistance the current required by resistors 30 and 84 and field winding 12 must overcome and, therefore, the portion of voltage $V_{bu}$ that remains to be applied to field winding 12. Rheostat 30 and resistor 84 help determine the voltage applied to the field winding 12, as the current flowing through these resistors must also flow through resistor 82, therefore adding to the voltage drop across resistor 82. As shown by the direction of arrow $I_{f2}$, the effect of the buck amplifier 50 on the field excitation current $I_f$ is a negative one, opposing the effecting current $I_{f1}$ produced by the generator voltage $V_g$.

FIG. 4 shows the superposition circuit for determining the effective component of field excitation current $I_{f3}$ produced by the output voltage $V_{bo}$ of boost amplifier 40. It can be seen that the value of resistors 30 and 82 are important, as they help determine the total current flowing through resistor 84 and therefore, help determine the portion of the voltage $V_{bo}$ dropped across resistor 84 and the portion that remains to be applied to the field winding 12. As shown by the direction of the arrow $I_{f3}$, the effective component of field excitation current produced by the output voltage $V_{bo}$ of boost amplifier 40, aids the component of field excitation current $I_{f1}$ produced by the generator voltage $V_g$. Thus, the values of resistors 82 and 84 and rheostat 30, in complex interaction, determine the magnitudes of field current $I_f$ produced in field excitation winding 12 by generator voltage $V_g$, buck amplifier voltage $V_{bu}$ and boost amplifier voltage $V_{bo}$.

The regulator circuit 70 compares the actual output voltage of the dynamoelectric machine 20 with the desired output voltage and any difference is amplified and applied to the output terminals 132 and 134 of regulator circuit 70. When the base excitation current applied to the field winding 12 is the value required to maintain the output voltage of armature 14 of exciter system 10 at the proper magnitude, the output voltage of regulating circuit 70 appearing at output terminals 132 and 134 will be zero. If the output voltage of armature 14 is below the desired magnitude, the output voltage of dynamoelectric machine 20 will be low, and an error voltage will appear at output terminals 132 and 134 of regulating circuit 70 in which terminal 132 will be more positive than terminal 134. Therefore, a control current $I_c$ will flow from terminal 132 on regulating circuit 70 into input terminal 52 on buck amplifier 50, as illustrated by the solid arrow. A current flowing into input terminal 52 on buck amplifier 50 decreases the output voltage $V_{bu}$ appearing at its output terminals 56 and 58. The current $I_c$ will leave the buck amplifier 50 at terminal 54 and enter into input terminal 62 of boost amplifier 40. A current into input terminal 62 of boost amplifier 40 increases the output voltage $V_{bo}$ appearing at its output terminals 66 and 68. The reduction in the output voltage $V_{bu}$ of buck amplifier 50 reduces the voltage drop across rheostat 30, thus reducing the portion of generator voltage $V_g$ dropped across rheostat 30 and increasing the portion of the voltage $V_g$ applied to field winding 12. The effective component of field winding current $I_{f1}$ produced by the generator voltage $V_g$ is thus increased. Further, the reduction in voltage $V_{bu}$ reduces the effective component of field excitation current $I_{f2}$, which is in opposition to the effective component of field excitation current $I_{f1}$ produced by the generator voltage $V_g$, giving the net effect of an increase in field excitation current. The increase in the output voltage $V_{bo}$ of boost amplifier 40 increases the effective component of field current $I_{f3}$ produced by the boost voltage $V_{bo}$. Since the effective component of field excitation current $I_{f3}$ aids the effective component $I_{f1}$ poduced by generator voltage $V_g$, and since the effective component of opposing field excitation current $I_{f2}$ produced by buck voltage $V_{bu}$ has been reduced, the net overall effect is an increase in field excitation current $I_f$, which increases the voltage applied to the field winding 16 of dynamoelectric machine 20 by the armature 14 of exciter system 10. The voltage output of dynamoelectric machine 20 is thus increased until it reaches the desired or preset value.

On the other hand, if the output voltage of the armature 14 of exciter system 10 is above the desired value, the output voltage of dynamoelectric machine 20 will be high and an error signal or voltage will appear at output terminals 132 and 134 of regulator 70 in which terminal 134 will be more positive than terminal 132. Therefore, a control current $I_c$ will flow from terminal 134 of the regulator circuit 70 into input terminal 64 of boost amplifier 40, as illustrated by the dotted arrow. A current flowing into input terminal 64 of boost amplifier 40 decreases the output voltage $V_{bo}$ of boost amplifier 40 appearing at its output terminals 66 and 68. The current $I_c$ will leave the boost amplifier 40 at terminal 62 and enter the buck amplifier 50 at input terminal 54. A current into buck amplifier input terminal 54 increases the output voltage $V_{bu}$ appearing at its output terminals 56 and 58. The increase in the voltage output $V_{bu}$ of buck amplifier 50 increases the voltage drop across rheostat 30, thus increasing the portion of generator voltage $V_g$ dropped across rheostat 30 and decreasing the portion of generator voltage $V_g$ applied to field winding 12. The effective component of field current $I_{f1}$ produced by the generator voltage $V_g$ is thus reduced. Further, the increase in voltage $V_{bu}$ increases the effective component of field excitation current $I_{f2}$ which is in opposition to the effective component of field excitation current $I_{f1}$, produced by the generator voltage $V_g$, giving the net effect of a decrease in field excitation current. The decrease in the output voltage $V_{bo}$ of boost amplifier 40, decreases the effective component of field current $I_{f3}$ produced by the boost voltage $V_{bo}$. Since the effective component of field excitation current $I_{f3}$ aids or adds to the effective component of field excitation current $I_{f1}$ produced by generator voltage $V_g$, and since the effective component of opposing field excitation current $I_{f2}$ produced by buck voltage $V_{bu}$ has been increased, the net overall effect is a decrease in field excitation current $I_f$, which decreases the voltage applied to the field winding 16 of dynamoelectric machine 20 by the armature 14 of the exciter system 10. The voltage output of dynamoelectric machine 20 is thus reduced, until it reaches the desired or preset value.

The embodiment illustrated in FIG. 1 is continuously acting, with no dead control band in the control current $I_c$ vs. generator voltage $V_g$ characteristic. This is accomplished by resistors 82 and 84, which move the operation of the circuit to that portion of the $I_c$ vs. $V_g$ curve where a change in control current $I_c$ results in a change in generator voltage $V_g$. Also, the resistors 82 and 84 reduce the magnitude of circulating currents and still allow negative forcing of the generator voltage as well as positive forcing. A forcing action with reverse excitation is achieved whenever the buck amplifier 50 drives the exciter output voltage $V_g$ down, and feeds through the exciter armature 14 and the exciter field 12. This negative forcing action would not be possible if an asymmetrically conducting device were to be used instead of resistors 82 and 84 to reduce the circulating currents.

Resistor 130 serves as the feedback circuit to the buck amplifier 50. As the exciter voltage $V_g$ increases, the feedback signal $I_{fb}$ causes the buck output voltage $V_{bu}$ to increase. This action helps stabilize the regulator, prevents exciter voltage build-up in the reverse direction, and prevents the exciter from building up voltage due to self-excitation when the amplifiers 40 and 50 are connected.

Further, the disclosed circuit may easily be transferred from automatic to manual control. This is done by adjusting rheostat 30 until the difference between the boost current $I_{bo}$ and the buck current $I_{bu}$ is zero in conductor 110. The buck and boost amplifiers 50 and 40 may then be disconnected, using disconnecting means 140, without changing the value of the generator field current. It should be noted that this does not involve the opening of an inductive circuit.

Figure 5A:
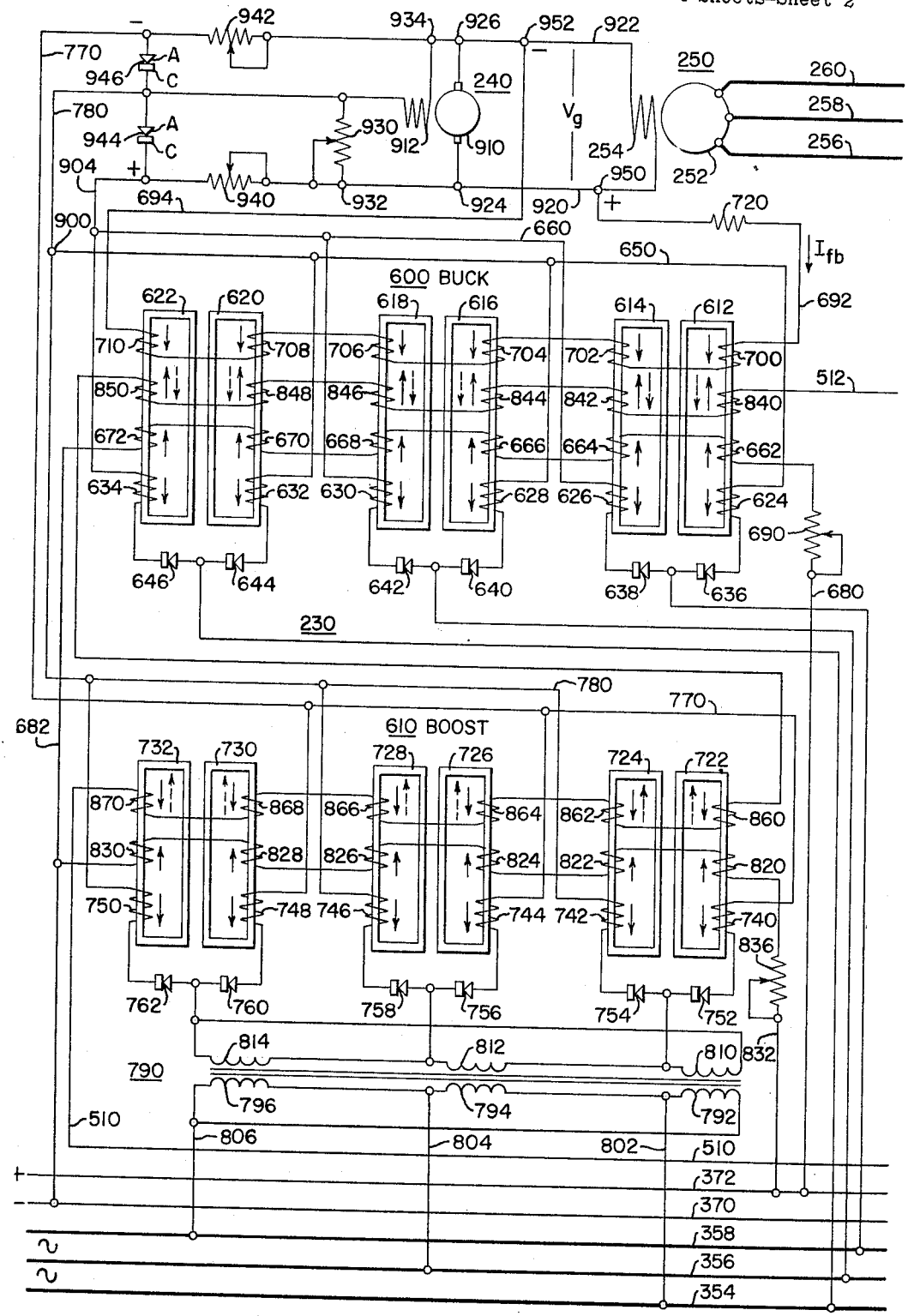
FIGS. 5A and 5B are schematic diagrams illustrating the invention incorporated into a complete regulating system.
Figure 5B:
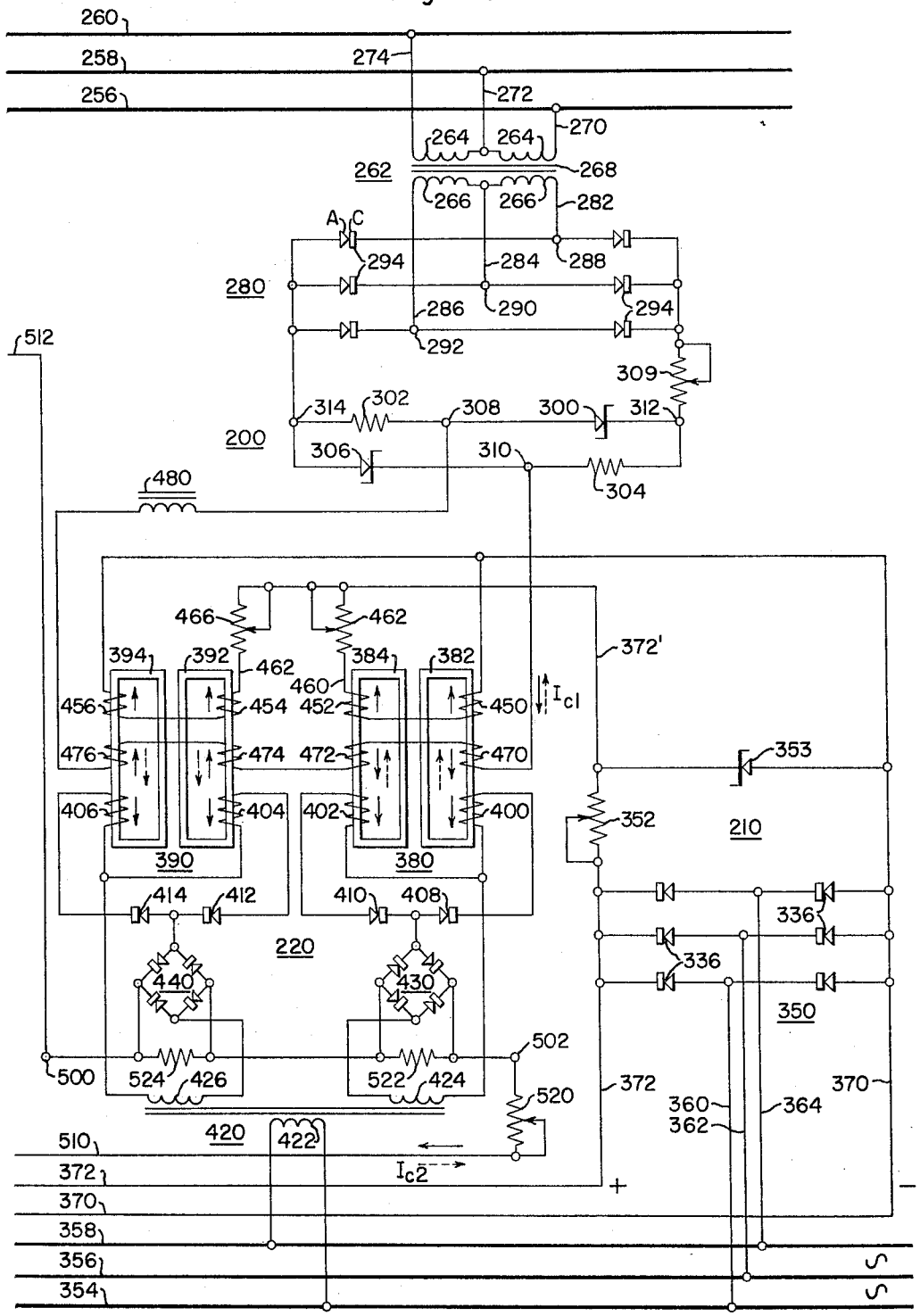

FIGS. 5A and 5B show the invention incorporated into a complete regulating system that may be used. In general, the regulating system comprises an error detecting circuit 200, a bias circuit 210, an intermediate amplifier 220, a buck-boost amplifier system 230 and an exciter system 240. In particular, three phase alternating current generator 250, having an armature 252 and a field winding 254 is disposed to supply electrical energy to conductors 256, 258 and 260. In order to obtain a measure of the output voltage of alternating current generator 250, a potential transformer 262 is connected in circuit relation with the generator line conductors 256, 258 and 260. Potential transformer 262 includes primary windings 264 and secondary windings 266 disposed in inductive relation with magnetic core 268. Primary or high voltage windings 264 are connected through conductors 270, 272 and 274 to generator line conductors 256, 258 and 260, respectively. In order to obtain a unidirectional voltage proportional to the output voltage of the generator 250, bridge rectifier 280 may be used. The secondary or low voltage windings 266 of potential transformer 262 are connected to bridge rectifier 280 through conductors 282, 284 and 286, with conductor 282 being connected to point 288, conductor 284 being connected to point 290 and conductor 286 being connected to point 292. The asymmetrically conducting devices 294, utilized in bridge rectifier 280, may be semiconductor diodes having an anode A and a cathode C.

In order to produce an error signal or voltage proportional to the deviation of the output voltage of the generator 250 from a preset or desired magnitude, the unidirectional output voltage produced by bridge rectifier 280 is applied to error detecting circuit 200. The error detecting circuit 200 comprises a well-known bridge circuit including two parallel branches, the first branch comprising semiconductor diode 300 connected in series circuit relation with a resistor 302 and a second branch comprising a resistor 304 connected in series circuit relation with a semiconductor diode 306. The output voltage of the error detecting circuit 200 appears at the output terminals 308 and 310 of the bridge circuit 200. The semiconductor diodes 300 and 306 are preferably of the type known to the art as Zener diodes.

In the operation of the error detecting circuit 200, the input of the bridge rectifier 280 is responsive to the output voltage of the generator 250 since the bridge rectifier 280 is connected to line conductors 256, 258 and 260 through the potential transformer 262. The direct current output voltage of the full wave bridge rectifier 280 is, therefore, a measure of the output terminal voltage of the generator 250. The rheostat 309 is provided in order to vary the portion of the output voltage of the full wave bridge rectifier 280 that is applied to the error detecting circuit 200 at the input terminals 312 and 314. During operation, the direct current voltages across the semiconductor diodes 300 and 306 remain substantially constant since the reverse voltage applied to each of the semiconductor diodes 300 and 306 is always of a greater magnitude than the reverse breakdown voltage of the semiconductor diodes 300 and 306. Since the resistors 302 and 304 are of equal value, it will be seen that when a direct current voltage is imposed at terminals 312 and 314, which is equal to twice the voltage drop across each of the semiconductor diodes 300 and 306, there will be no voltage difference existing between the output terminals 308 and 310 of the error detecting bridge circuit 200. When, however, the voltage across the input terminals 312 and 314 is either above or below the reference voltage of the bridge circuit 200, which is twice the voltage drop across each of the semiconductor diodes 300 and 306, then a voltage difference or error voltage will exist between the output terminals 308 and 310. The polarity of the output voltage of the error detecting circuit 200 at the output terminals 308 and 310 will depend upon whether the input voltage is above or below the reference voltage of the bridge circuit 200. The setting of the rheostat 309 determines the magnitude at which the regulator system is to maintain the output terminal voltage of the generator 250.

In order to provide a unidirectional bias voltage for the operation of the amplifier circuits 220 and 230, bias circuit 210 may be used. Bias circuit 210 includes three phase bridge rectifier circuit 350, rheostat 352 and semiconductor diode 353. Semiconductor diode 353 is preferably of the type known in the art as a Zener diode. Full wave bridge rectifier 350 is connected to conductors 354, 356 and 358 through conductors 360, 362 and 364. Conductors 354, 356 and 358 may be connected to a separate alternating potential source or to the output of generator 250. Bridge rectifier 350, which may include semiconductor diodes 366, produces a unidirectional output voltage at conductors 370 and 372. The voltage across conductors 370 and 372 remains constant because of the action of the Zener diode 354. Rheostat 352 may be used to obtain the desired unidirectional output voltage.

In order to amplify the error or control signal produced by error detecting bridge circuit 200, amplifier circuit 220 may be used. As illustrated, amplifier 220 is connected in push-pull and is of standard construction. Amplifier 220 comprises two main sections 380 and 390. The section 380 comprises two magnetic core members 382 and 384, and the section 390 comprises two magnetic core members 392 and 394. In this instance, the load windings 400, 402, 404 and 406 are disposed in inductive relationship with the magnetic core members 382, 384, 392 and 394, respectively. As is customary, self-saturation for the magnetic amplifier 220 is obtained by connecting in series circuit relationship with the load windings 400, 402, 404 and 406, self-saturating rectifiers 408, 410, 412 and 414, respectively.

In order to form a doubler circuit of the section 380, the series circuit including the load winding 400 and the self-saturating rectifier 408 is connected in parallel circuit relationship with the series circuit including the load winding 402 and the self-saturating rectifier 410. In like manner, in order to form a doubler circuit of the section 390, the series circuit including the load winding 404 and the self-saturating rectifier 412 is connected in parallel circuit relationship with the series circuit including the load winding 406 and the self-saturating rectifier 414.

Energy for the load windings 400, 402, 404 and 406, of the magnetic amplifier 220 is received from a transformer 420 having a primary winding 422, which in this instance is responsive to the voltage on alternating potential line conductors 354 and 358, and secondary winding sections 424 and 426. As illustrated, a full wave dry type load rectifier 430 is interconnected with the hereinbefore described parallel circuit of magnetic amplifier section 380, and with the secondary winding section 424 of the transformer 420, in order to produce a direct current output for the section 380. In like manner, a full wave dry type load rectifier 440 is interconnected with the hereinbefore described parallel circuit of magnetic amplifier section 390, and with the secondary winding section 426 of the transformer 420, in order to obtain a direct current output for the section 390.

For the purpose of biasing each of the sections 380 and 390 of the magnetic amplifier 220, bias windings 450, 452, 454 and 456 are disposed in inductive relationship with the magnetic core members 382, 384, 392 and 394, respectively. In particular, the bias windings 450 and 452 are connected in series circuit relationship with one another, the series circuit being connected to conductors 370 and 372' which have applied thereto a substantially constant direct current voltage from bias circuit 210. Rheostat 462 allows the direct current voltage to be adjusted to the proper magnitude. Bias windings 454 and 456 are connected in series circuit relationship with one another, the series circuit being connected to conductors 370 and 372' which have applied thereto a substantially constant direct current voltage. Rheostat 466 allows the direct current voltage to be adjusted to the proper magnitude. In operation, the current flow through the bias windings 450, 452, 454 and 456 produces a magnetomotive force with respect to their respective magnetic core members that opposes the magnetomotive force produced by the current flow through the load windings 400, 402, 404 and 406, respectively.

As customary, control windings 470, 472, 474, and 476 are disposed in inductive relationship with the magnetic core members 382, 384, 392 and 394, respectively. The control windings 370, 372, 374 and 376 are connected in series circuit relationship with one another, the series circuit being connected to the output terminals 308 and 310 of error detecting bridge circuit 200. Filter choke 480 may be used to smooth the waveform of the control voltage appearing at the output terminals 308 and 310 of error detecting circuit 200. The control windings 470 and 472 are so disposed on their respective magnetic core members 382 and 384 that when output terminal 310 of error detecting circuit 200 is positive with respect to output terminal 308, current flowing through control windings 470 and 472 produces a magnetomotive force that aids the magnetomotive force produced by the load windings 400 and 402, thus increasing the output voltage of magnetic amplifier section 380. Control windings 474 and 476 are so disposed relative to their magnetic core members 392 and 394 that when output terminal 310 is positive with respect to terminal 308, the control current flowing through control windings 474 and 476 produces a magnetomotive force that opposes the magnetomotive force produced in magnetic core members 392 and 394 by load windings 404 and 406, thus reducing the output voltage of magnetic amplifier section 390. On the other hand, when the output terminal 308 of error detecting circuit 200 is more positive than output terminal 310, the direction of the current flow through the respective load windings is reversed. In this instance, the current flowing through load windings 470 and 472 produces a magnetomotive force in magnetic core members 382 and 384 that opposes the magnetomotive force produced in said core members by load windings 400 and 402, thus decreasing the output voltage of magnetic amplifier section 380. On the other hand, current flowing through load windings 474 and 476, when output terminal 308 is more positive than output terminal 310, produces a magnetomotive force in magnetic core members 392 and 394 that aids the magnetomotive force produced in said magnetic core members by load windings 404 and 406, thus increasing the output voltage of magnetic amplifier section 390. Thus, in operation, when the output voltage of the generator 205 increases to a value above its regulated value, the output terminal 308 will be more positive than output terminal 310, causing the control current $I_c$ to flow through control windings, as shown by the dotted arrow $I_{c1}$, in the direction from control winding 476 to winding 470. This produces a voltage across dry type rectifier 440 that is more positive than the voltage produced across the dry type rectifier 430, since the output voltage of section 390 has increased and the output voltage of section 380 has decreased, making terminal 500 more positive than terminal 502. On the other hand, when the output voltage of the generator 10 falls to a value below its regulated value, terminal 310 will be more positive than terminal 308 and the current flow through the control windings 470, 472, 474 and 476 will be reversed, or as illustrated by the solid arrow $I_{c1}$. Therefore, the output voltage of dry type rectifier 430 and terminal 502 will be more positive than the output voltage of dry type rectifier 440 and terminal 500. When terminal 502 is more positive than terminal 500 current will flow in line conductor 510 as illustrated by the solid arrow $I_{c2}$ and when terminal 500 is more positive than terminal 502, control current will flow in line conductor 510 in the direction indicated by the dotted arrow $I_{c2}$. Rheostat 520 may be used to adjust the magnitude of the error or control signal $I_{c2}$ applied to amplifier circuit 230. Resistors 522 and 524 are load resistors for dry type rectifiers 430 and 440, respectively.

Magnetic amplifier circuit 230 is responsive to the output error signal $I_{c2}$ from error detecting bridge circuit 200, as amplified by intermediate amplifier 220. As illustrated, the magnetic amplifier 230 comprises two, three-phase magnetic amplifiers connected in push-pull, with section 600 being the buck section and section 610 being the boost section. The buck section 600 comprises magnetic core members 612, 614, 616, 618, 620 and 622 which have disposed in inductive relationship therewith, the load windings 624, 626, 628, 630, 632 and 634, respectively. In this instance, the load windings 624, 626, 628, 630, 632 and 634 have connected in series circuit relationship therewith, the self-saturating rectifiers 636, 638, 640, 642, 644 and 646, respectively, in order to insure that current flows in only one direction through the respective load windings. As illustrated, the load windings 624, 628 and 632 are so connected to conductor 650 of the magnetic amplifier 600 and load windings 626, 630 and 634 are so connected to the output conductor 660, that the output current of the magnetic amplifier 600 flows in only one direction. Energy for the load windings 624, 626, 628, 630, 632 and 634 of the magnetic amplifier 600 is received from three-phase alternating current line conductors 354, 356 and 358.

In order to bias the magnetic amplifier 600 by a predetermined amount, the magnetic core members 612, 614, 616, 618, 620 and 622 have disposed in inductive relationship therewith the biasing windings 662, 664, 666, 668, 670 and 672, respectively. As illustrated, the biasing windings 662, 664, 666, 668, 670 and 672 are connected in series circuit relationship with one another through line conductors 680 and 682 to conductors 370 and 372 which have a substantially constant unidirectional voltage applied thereto by biasing circuit 210. Rheostat 690 may be used to adjust the proper magnitude of the biasing potential. The biasing windings 662, 664, 666, 668, 670 and 672 are so disposed on their respective magnetic core members that current flow therethrough produces a magnetomotive force which opposes the magnetomotive force produced by the current flow through each of the respective load windings 624, 626, 628, 630, 632 and 634.

In order to provide a feedback signal to the buck section 600 of magnetic amplifier system 230, a signal proportional to the output voltage of the exciter system 240 is applied through line conductors 692 and 694 to feedback windings 700, 702, 704, 706, 708 and 710. Feedback windings 700, 702, 704, 706, 708 and 710 are inductively disposed relative to their respective magnetic core members and produce a magnetomotive force in said magnetic core members that aids the magnetomotive force produced by the respective load windings 624, 626, 628, 630, 632 and 634. Resistor 720 provides the proper range of magnitude of the feedback signal $I_{fb}$.

The boost section 610 of magnetic amplifier circuit 230 comprises magnetic core members 722, 724, 726, 728, 730 and 732 which have disposed in inductive relationship therewith, the load windings 740, 742, 744, 746, 748 and 750, respectively. In this instance, the load windings 740, 742, 744, 746, 748 and 750 are connected in series circuit relationship with the self-saturating rectifiers 752, 754, 756, 758, 760 and 762, respectively in order to insure that the current flows in only one direction through the respective load windings. As illustrated, the load windings 740, 744, and 748 are so connected to output conductor 770 of section 610, and the load windings 742, 746 and 750 are so connected to the output conductor 780, that the output current of the magnetic amplifier section 610 flows in only one direction.

Energy for the load windings 740, 742, 744, 746, 748 and 750 of the magnetic amplifier 610 is received from a three-phase isolation transformer 790, having primary windings 792, 794 and 796 connected through conductors 802, 804 and 806 to three-phase alternating potential conductors 354, 356 and 358, respectively. Secondary windings 810, 812 and 814 of isolation transformer 790 are connected to the load circuits on magnetic amplifier section 610.

In order to bias the magnetic amplifier 610 by a predetermined amount, the magnetic core members 722, 724, 726, 728, 730 and 732 have disposed in inductive relationship therewith, the biasing windings 820, 822, 824, 826, 828 and 830, respectively. As illustrated, the biasing windings 820, 822, 824, 826, 828 and 830 are connected in series circuit relationship with one another through line conductors 832 and 682 to conductors 372 and 370, which have a unidirectional voltage applied thereto by biasing circuit 210. Rheostat 836 may be used to obtain the proper magnitude of biasing potential. The biasing windings 820, 822, 824, 826, 828 and 830 are so disposed on their respective magnetic core members that current flowing therethrough produces a magnetomotive force which opposes the magnetomotive force produced by the current flow through each of the respective load windings 740, 742, 744, 746, 748 and 750.

In order to make magnetic amplifier section 600 and 610 responsive to the control signal $I_{c2}$ applied thereto through conductors 510 and 512 from error detecting circuit 200 and amplifier 220, control windings 840, 842, 844, 846, 848 and 850 of section 600 are disposed in inductive relationship with the magnetic core members 612, 614, 616, 618, 620 and 622, respectively. In section 610 of magnetic amplifier circuit 230, control windings 860, 682, 864, 866, 868 and 870 are disposed in inductive relationship with magnetic core members 722, 724, 726, 728, 730 and 732, respectively. As illustrated, the control windings from both the buck and boost sections 600 and 610 are connected in series circuit relation with one another and are so disposed on their respective core members that when the control current flows in one direction therethrough the magnetomotive force produced in one section opposes the magnetomotive force produced by the load windings and in the other section the magnetomotive force produced by the control current aids the magnetomotive force produced by the load windings. More specifically, when terminal 502 of amplifier 220 is more positive than terminal 500, current $I_{c2}$ will flow through line conductor 510 in the direction indicated by the solid arrow, and the magnetomotive force produced by control windings 840, 842, 844, 846, 848 and 850 opposes the magnetomotive force produced in the respective magnetic core members by load windings 624, 626, 628, 630, 632 and 634. Thus, when the output voltage of generator 250 is low and terminal 502 of amplifier 220 is positive, the current flow through the buck section 600 is such to reduce the output voltage of section 600 appearing at conductors 650 and 660. The control current $I_{c2}$, flowing through the control windings 860, 862, 864, 866, 868 and 870 of section 610, when terminal 502 of amplifier 220 is more positive than terminal 500, produces a magnetomotive force in the respective magnetic core members 722, 724, 726, 728, 730 and 732 that aids the magnetomotive force produced in said magnetic core members by load windings 740, 742, 744, 746, 748 and 750. Therefore, when the output voltage of generator 250 is lower than the regulated value, the output voltage from the boost section 610 appearing at conductors 770 and 780 will be increased. On the other hand, when the output voltage of generator 250 is above the desired value, terminal 500 of amplifier 220 will be more positive than terminal 502 and current will flow through the series connected load windings of buck and boost sections 600 and 610 in a direction as indicated by the dotted arrow $I_{c2}$. A current flowing in the direction indicated by the dotted arrow $I_{c2}$ through control windings 840, 842, 844, 846, 848 and 850 on buck section 600 produces a magnetomotive force in the respective core members that aids the magnetomotive force produced in said core members by load windings 624, 626, 628, 630, 632 and 634, therefore increasing the output voltage of buck section 600 appearing at output conductors 650 and 660. This same current flowing through boost section 610 and the load windings 860, 862, 864, 866, 868 and 870 produces a magnetomotive force in their respective magnetic core members that opposes the magnetomotive force in said magnetic core members produced by load windings 740, 742, 744, 746, 748, and 750, therefore decreasing the output voltage of boost section 610 applied to output conductors 770 and 780. Output conductor 650 of buck section 600 is connected to output conductor 780 of boost section 610 at junction 900 and junction 900 is connected through line conductor 780 to the excitation system 240, as will hereinafter be explained. Output conductor 660 of buck section 600 is connected to exciter system 240 through line conductor 904 and output conductor 770 of boost section 610 is connected to the exciter system 240 through a line conductor.

The exciter system 240 comprises an armature 910 disposed to supply electrical energy to field winding 254 of alternating current generator 250, and excitation field winding 912. More specifically, the armature 910 of exciter system 240 is connected to conductors 920 and 922 at points 924 and 926, respectively. Conductors 920 and 922 are connected to field winding 254 of alternating current generator 250, therefore applying the output voltage of exciter system 240 to the field winding 254 of said alternating current generator. The output voltage of armature 910 of exciter system 240 is also applied to the field winding 912. However, instead of the total armature voltage $V_g$ being applied to field winding 912, a rheostat 930 is connected in series circuit relation with the field winding 912 and said series circuit is connected to conductors 920 and 922 at points 932 and 934, respectively. The output voltages of buck and boost magnetic amplifiers 600 and 610 are connected across the series circuit comprising rheostat 930 and field winding 912 through resistors 940 and 942. Rectifiers 944 and 946, which may be semiconductor diodes, are connected across the output conductors of buck and boost amplifiers 600 and 610, with the cathode electrode C of diode 944 being connected to conductor 904 and the anode electrode A being connected to conductor 780. Semiconductor diode 946 has its cathode electrode C connected to conductor 902 and its anode electrode A connected to conductor 770. As hereinbefore mentioned, a feedback circuit is provided through resistor 720, with conductor 692 being connected to conductor 920 at point 950, and conductor 694 being connected to conductor 922 at point 952.

In the operation of the regulator system shown in FIGS. 5A and 5B, the function of the exciter system 240 is to provide an excitation voltage $V_g$ to the field winding 254 of alternating current generator 250 so that the output voltage applied to conductors 256, 258 and 260 will remain substantially at the desired regulated value. In order to obtain a signal proportional to the generator terminal voltage appearing at conductors 256, 258 and 260, a potential transformer 262 is connected to said output terminals and applies an alternating current voltage proportional to said generator terminal voltage to bridge rectifier circuit 280. Bridge rectifier circuit 280 provides a unidirectional voltage proportional to the output voltage of generator 250 and applies this unidirectional voltage to error detecting bridge circuit 200, which produces a signal at its output terminals 308 and 310 when the output voltage of generator 250 is above or below the desired regulated value. The polarity of the signal appearing at terminals 308 and 310 of error detecting circuit 200 depends upon whether the output voltage of generator 250 is above or below the desired value. For example, when the output voltage of generator 250 is above the desired regulated value, an error signal will be produced at output terminals 308 and 310 of error detecting bridge circuit 200, with terminal 310 being more positive than terminal 308. On the other hand, when the output voltage of generator 250 is below the desired regulated value, an error signal will be produced at output terminals 308 and 310 of error detecting bridge circuit 200 in which terminal 308 is more positive than terminal 310. In order to amplify the error signal produced by error detecting bridge circuit 200, push-pull magnetic amplifier 220 may be used, which also produces an output voltage of reversible polarity, with the polarity determined by the magnitude of the generator terminal voltage with respect to the desired regulated value. For example, when the output voltage of generator 250 is above the desired regulated value, magnetic amplifier 220 will produce an output in which output terminal 500 is more positive than output terminal 502. On the other hand, when the output voltage of generator 250 is below the desired regulated value, magnetic amplifier 220 will produce an output voltage in which output terminal 502 is more positive than terminal 500. In order to provide a signal of the proper magnitude which adds to, or subtracts from, the excitation current produced by the exciter generator voltage, the error voltage as amplified by amplifier 220 is applied to push-pull magnetic amplifier system 230. When the output voltage of generator 250 is above the desired regulated value, the buck section 600 increases its output voltage appearing at conductors 650 and 660. At the same time, the output of boost section 610 appearing at conductors 770 and 780 is reduced. As hereinbefore explained, the output voltage of section 600 is applied across rheostat 930, and as the output voltage of buck section 600 increases, the portion of the generator voltage $V_g$ dropped across rheostat 930 is increased with the result that the excitation current produced in field winding 912 by the generator voltage $V_g$ is reduced. Also, since the output voltage of boost section 610 is applied directly to field excitation winding 912, and produces a component of excitation current which aids the component of excitation current produced by the generator voltage $V_g$, there will be less excitation current produced in excitation winding 912 due to boost section 610, due to the fact that the output of boost section 610 has been reduced. The net effect is a reduction in excitation current through excitation winding 912, with the consequent reduction in voltage $V_g$ produced by armature 912 of excitation system 240. The reduction in voltage $V_g$ reduces the excitation current through field winding 254 of alternating current generator 250, thus reducing the output voltage of armature 252 applied to generator line conductors 256, 258 and 260.

When the output voltage of generator 250 is below the desired regulated value, the polarity of the error signal $I_{c1}$ produced by error detecting circuit 200 at its output terminals 308 and 310 is such that terminal 308 is more positive than terminal 310. This produces an output voltage from amplifier 220 in which terminal 502 is more positive than terminal 500, and this amplified signal being applied to magnetic amplifier system 230 reduces the output of buck section 600 and increases the output voltage of boost section 610. Since the output of buck section 600 has been reduced, the reduced voltage across rheostat 930 results in less exciter output voltage $V_g$ being dropped across said rheostat, causing the excitation current produced by voltage $V_g$ through field winding 912 to increase. Also, since the output voltage of boost section 610 has increased, the component of excitation current flowing through excitation winding 912 due to the boost voltage produced by section 610 is increased. The net overall effect is an increase of excitation current flowing through excitation field winding 912 with the consequent increase in output voltage $V_g$ produced by armature 910 of the exciter system 240. This increase in armature voltage $V_g$ of armature 910 increases the excitation voltage applied to field winding 254 of generator 250, increasing the output voltage of armature 252 applied to line conductors 256, 258 and 260.

In summary it can be seen that the regulating system shown in FIGS. 5A and 5B is a fast acting continuously acting system using static unidirectional amplifiers and a single field winding for the self-excited direct current generator. The resistors 940 and 942 allow the generator voltage $V_g$ to be negatively forced as well as positively forced and allows the operation of the regulator system 240 to be maintained in the optimum portion of the control current vs. generator voltage curve so that there are no dead bands in this control characteristic.

Figure 6:
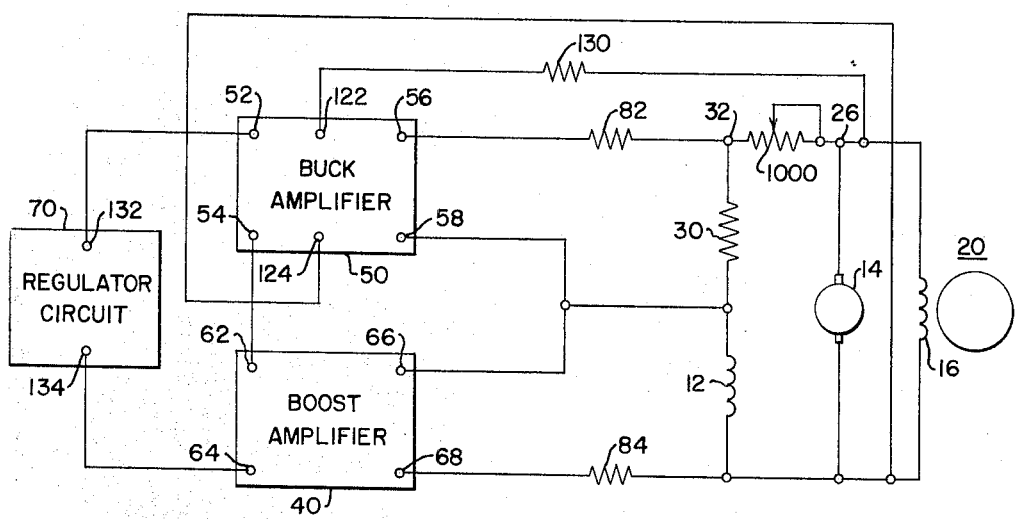
FIG. 6 is a schematic diagram illustrating another embodiment of the invention.
Figure 7:
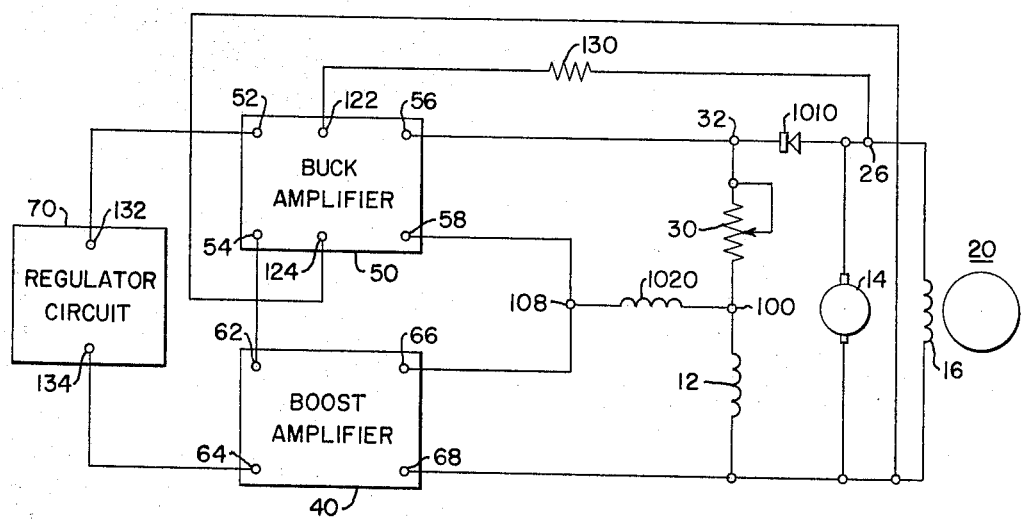
FIG. 7 is a schematic diagram illustrating another embodiment of the invention.

FIGS. 6 and 7 show other embodiments of the invention, in which like reference numerals in FIGS. 1, 6 and 7 indicate like components. By the addition of rheostat 1000 between points 26 and 32, as shown in FIG. 6, a system is disclosed wherein the voltage output of the amplifiers 40 and 50 may be much lower than the output voltage $V_g$ of the exciter armature 14. This is due to the fact that a large portion of the exciter voltage $V_g$ may be dropped across rheostat 1000, with the regulator only required to overcome a small portion of the exciter field voltage for control purposes.

FIG. 7 illustrates an embodiment of the invention whereby resistors 82 and 84 of FIG. 1 may be eliminated and replaced with an asymmetrically conducting device 1010, which may be a semiconductor diode. This semiconductor diode may be located between points 32 and 26. However, in order to provide buck forcing with negative ampere turns, without going through the exciter armature 14, an auxiliary control field 1020 is required on the exciter. This auxiliary control field may be connected from point 108 to point 100.

Since numerous changes may be made in the above described apparatus and circuits, and different embodiments of the invention may be made without departing from the spirit thereof, it is intended that all the matter contained in the foregoing description or shown in the accompanying drawings shall be interpreted as illustrative and not in a limiting sense.

We claim as our invention:

1. An electric circuit for regulating a predetermined quantity of a dynamoelectric machine comprising,
   a direct current generator having a single field winding and positive and negative output terminals,
   first resistance means,
   said first resistance means and said field winding being serially connected, providing a series circuit having first and second ends and a common terminal,
   the first and second ends of said series circuit being connected to the positive and negative output terminals of said direct current generator, providing a current flow through said series circuit in a first predetermined direction,
   regulator means disposed to be responsive to the predetermined quantity to be regulated,
   said regulator means providing a control signal responsive to the deviation of the magnitude of the predetermined quantity from a desired magnitude,
   and first and second unidirectional amplifier means,
   said first and second unidirectional amplifier means each being connected in circuit relation with said regulator means, and each having positive and negative output terminals,
   said first and second unidirectional amplifier means providing buck and boost voltages, respectively, at their output terminals, whose magnitudes are controlled by the control signal of said regulator means,
   the buck output voltage of said first unidirectional amplifier means being applied across said resistance means, with the polarity of the buck output voltage providing current flow through said resistance means in said first predetermined direction, the magnitude of the current flow through said first resistance means due to said buck output voltage controlling the division of the output voltage of said direct current generator across said resistance means and said field winding,
   the boost output voltage of said second unidirectional amplifier being applied across said field winding, with the polarity of the boost output voltage providing current flow through said field winding in the first predetermined direction, the current flow through said field winding provided by said boost output voltage adding to the current flow through said field winding provided by that portion of the output voltage of the direct current generator applied to said field winding.

2. The electric circuit of claim 1, including second and third resistance means, wherein the buck output voltage of said first unidirectional amplifier means is applied to said first resistance means through said second resistance means, and the boost output voltage of said second unidirectional amplifier means is applied to said field winding through said third resistance means.

3. The electric circuit of claim 1, including fourth resistance means, wherein said series circuit is connected to the output terminals of said direct current generator through said fourth resistance means.

4. The electric circuit of claim 2, including fourth resistance means, wherein said series circuit is connected to the output terminals of said direct current generator through said fourth resistance means.

5. The electric circuit of claim 1, including feedback means connected between the output terminals of said direct current generator and said first unidirectional amplifier means, providing a feedback signal wherein the buck output voltage of said first unidirectional amplifier means is directly responsive to said feedback signal.

6. The electric circuit of claim 1, including an auxiliary field winding and asymmetrically conductive means, wherein said first and second unidirectional amplifiers are connected to the common terminal of said series circuit through said auxiliary field winding, and said series circuit is connected to the output terminals of said direct current generator through said asymmetrically conductive means, said asymmetrically conductive means being poled to allow current to flow from said direct current generator through said series circuit in the first predetermined direction.

References Cited by the Examiner

UNITED STATES PATENTS

| | | | |
|---|---|---|---|
| 2,330,638 | 9/1943 | Stratton | 322—25 X |
| 2,883,608 | 4/1959 | Rosenblatt et al. | 322—25 |
| 2,899,630 | 8/1959 | Smith | 322—25 |
| 2,981,882 | 4/1961 | Rosenblatt | 322—25 X |

MILTON O. HIRSHFIELD, *Primary Examiner.*

J. J. SWARTZ, *Assistant Examiner.*